United States Patent [19]

Brewer

[11] Patent Number: 4,540,455
[45] Date of Patent: Sep. 10, 1985

[54] METHOD OF MANUFACTURING LAMINATED FOAM PLASTICS MATERIALS

[76] Inventor: William D. Brewer, 573, Walmersley Rd., Bury, Lancashire, England

[21] Appl. No.: 592,712

[22] Filed: Mar. 23, 1984

[30] Foreign Application Priority Data

Mar. 31, 1983 [GB] United Kingdom ............... 8309033
Jun. 16, 1983 [EP] European Pat. Off. ........ 83303500.9

[51] Int. Cl.$^3$ .................... B32B 31/12; B32B 5/20
[52] U.S. Cl. ................................ 156/79; 156/324; 264/46.5; 427/355; 427/359; 428/317.5
[58] Field of Search ........................... 118/110–113, 118/116, 123; 156/78, 79, 324; 264/46.5; 427/355, 356, 359; 428/317.5

[56] References Cited

U.S. PATENT DOCUMENTS

| Re. 27,109 | 3/1971 | Videen | 427/359 X |
| 3,759,772 | 9/1973 | Andersson | 156/324 X |
| 3,942,925 | 3/1976 | Schmitzer et al. | 264/46.5 X |

Primary Examiner—Robert A. Dawson
Attorney, Agent, or Firm—Weiss & Holloway

[57] ABSTRACT

A method of manufacturing laminated plastics materials comprising passing a first sheet material adjacent a barrier in parallel spaced relation to the barrier which is disposed obliquely to the direction of passage of the first sheet material and applying a quantity of unfoamed polyurethane prepolymer at or adjacent the edge of the first sheet upstream of the most upstream part of the barrier. A second sheet material may be applied to the foam as it passes under the barrier.

10 Claims, 1 Drawing Figure

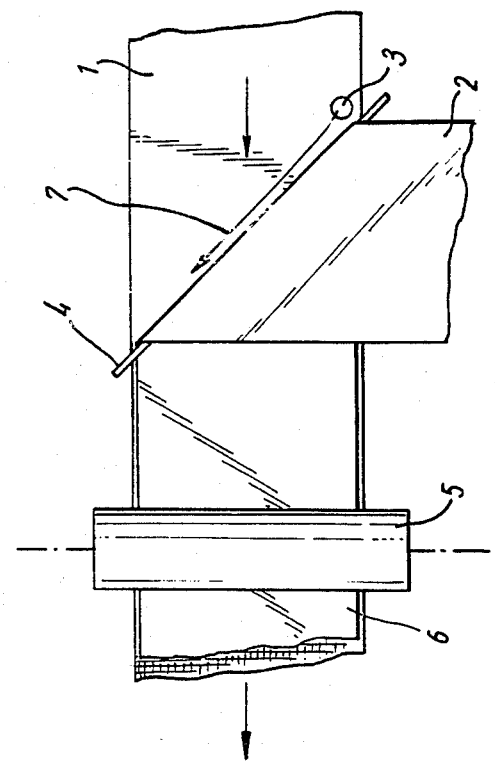

METHOD OF MANUFACTURING LAMINATED FOAM PLASTICS MATERIALS

This invention relates to a method of manufacturing laminated plastics materials, particularly to a method of manufacturing materials comprising a layer of foamed plastics material such as polyurethane laminated between sheets of one or more other materials in a continuous process.

Such laminated materials have been manufactured by processes in which a liquid, unfoamed prepolymer is sprayed onto the surface of a first sheet of material, allowed to foam and before foaming is complete, a second sheet of material is applied upon the foaming mixture. The sheets are then passed through a press to create an even thickness of foamed mixture between the sheets.

Alternatively, individual streams of prepolymer reagents have been applied to the first sheet and the foaming mixture passed through spaced rollers together with the second sheet.

Both of these methods suffer from the disadvantage that uneven distribution of the foam occurs between the sheets, making it necessary to post treat the laminate by rolling or pressing.

Conventional apparatus is difficult to adjust since the apparatus is complex and there are many variable parameters.

According to the present invention a method of manufacturing laminated material comprises the steps of:
- arranging a barrier in spaced relation to a first sheet material,
- applying a quantity of unfoamed prepolymer onto said material adjacent an edge of the material,
- causing the sheet and prepolymer to pass adjacent said barrier, and
- allowing the prepolymer to foam as it passes adjacent the barrier,
- wherein the barrier is disposed obliquely to the direction of passage of said material,
- and wherein the said quantity of prepolymer is applied onto said material upstream of the most upstream part of the barrier.

The oblique barrier serves to spread the foam acroos the first sheet as the sheet passes adjacent the barrier. The first sheet may be supported on a lower support such as a conveyor or fixed bed.

The barrier is preferably parallel to the first sheet so that an even thickness of foam mixture is applied to the sheet. A non-parallel barrier may be employed to compensate for compression of the foaming material and consequent non-parallel expansion after passage under the barrier. The barrier may be straight or curved in the plane of the first sheet material. The separation between the first sheet material and the barrier is preferably less than the thickness of the foamed layer of the laminate. Polyurethane foams may have an expansion ratio of 35:1. A separation of 0.3 mm may be employed to provide a thickness of foam of 1 cm.

The quantity of unfoamed prepolymer may be applied to the first sheet at two or more locations.

In preferred embodiments of the invention a second sheet material is applied upon the foaming polymer. The resultant laminate may have the form of a layer of foamed material sandwiched between two layers of sheet material.

The second sheet material may be applied by passage of the first sheet and foam adjacent a barrier adjacent which the second sheet is also passed. The barrier serves to ensure even distribution of the foam.

Alternatively and more preferably the barrier may comprise a straight linear bar, roller, rod or like elongated structure arranged at between 30 to 60 degrees, preferably 45 degrees to the direction of passage of the first sheet. A slightly non-linear barrier may be alternatively used, non-linearity of the foamed product being compensated by subsequent rolling or other processing. A second sheet may be fed around the barrier and applied directly to the foaming mixture as the latter passes under the barrier. The laminate may be subsequently passed through one or more rollers or presses to ensure even distribution of the foam.

This invention relates particularly to laminates comprising foamed polyurethane although any other convenient foamed polymers may be used.

The apparatus for carrying out the method is preferably disposed in a generally horizontal plane. Alternatively, the first sheet may pass vertically adjacent the barrier.

The laminate containing the foamed polymer may be heated to cure the foam if necessary.

The invention will now be described by means of example and not in any limitative sense with reference to the accompanying drawing which shows apparatus for performance of the method in accordance with this invention.

The accompanying drawing is a top plan view of the invention showing first and second sheets of material passing under an obliquely positioned bar which ensures an even distribution of a layer of foamed plastics material applied onto the first sheet.

A first sheet 1 of flexible paper, plastics or metal sheeting or of a rigid material such as plastics, wood or metal is passed by a conveyor, live rollers or other means under a bar 4, the latter being arranged at 45 degrees to the direction of passage of the sheet 1. Alternatively, the sheet 1 may be drawn through the apparatus by a take up roller or conveyor. The bar 4 in some embodiments of the invention may be curved in the plane of the drawing. However, a straight bar is preferred. The bar may also take the form of a rotatable roller under which a second sheet 2 is passed. A non-rotatable bar 4 may be preferred to minimise lateral creep of the sheet 2. The separation between the sheet 1 and bar 4 is preferably constant across the width of the sheet. Alternatively the centre of the bar may be curved towards the first sheet to compensate for uneven, non-parallel expansion of the foam which may otherwise lead to the sheet being thicker at the centre than at the edges. The second sheet 2 may be composed of paper, plastics, metal foil, metallised plastics or any other flexible material. Mixed polyurethane prepolymer is placed continuously upon the sheet at 3. The separation of the bar 4 is arranged so that the separation between the sheets 1 and 2, for example 0.5 mm, is sufficient to produce a foamed layer of a required thickness, for example 23 mm, after passage under the bar and subsequent expansion and solidification of the foam. The motion of the sheets under the bar 4 causes the foam mixture to be evenly distributed across their width as shown by the arrow 7. A roller 5, which is optional, serves to smooth the laminate.

The bar 4 may be arranged at any convenient angle although angles between 30 and 60 degrees and particularly 45 degrees are preferred.

Use of this method has the advantage that there are no fumes produced as is the case when using a spray to distribute the prepolymer. Better distribution is achieved than when using individual streams of prepolymer applied to the sheets. The simplicity of the apparatus makes it easy to control the thickness and uniformity of the product without expensive trial running of the apparatus. The rate of passage of the sheets through the apparatus is greater than when using conventional methods, speeds of 30 m/minute or greater being attainable. This may be important when using fast curing polyurethane foams.

While the invention has been particularly shown and described with reference to preferred embodiments thereto, it will be understood by those skilled in the art that the foregoing and other changes in form and details may be made therein without departing from the spirit and scope of the invention.

What I claim is:

1. A method of manufacture of laminated material, comprising the steps of:
    arranging a barrier in spaced relation to a first sheet material,
    applying a quantity of unfoamed prepolymer onto said first sheet material adjacent an edge of the material,
    causing the first sheet and prepolymer to pass adjacent said barrier,
    allowing the prepolymer to foam as it passes adjacent the barrier, and
    allowing the foam to cure to form a laminated material,
    wherein the barrier is disposed obliquely to the direction of passage of said first sheet material,
    and wherein the said quantity of the prepolymer is applied onto said first sheet material upstream of the most upstream part of the barrier.

2. A method as claimed in claim 1, wherein the barrier is arranged in parallel spaced relation to the first sheet.

3. A method as claimed in claim 1, further comprising the step of applying a second sheet material onto the prepolymer before curing of the foam so that the prepolymer is disposed between the first and second sheets of material.

4. A method as claimed in claim 3, wherein the second sheet material is applied onto the prepolymer by passage of the first and second sheets of material under the barrier while foaming the prepolymer as it passes adjacent the barrier.

5. A method as claimed in claim 4, wherein the barrier comprises an elongated structure arranged at an angle of about 30 to 60 degrees to the direction of passage of the first sheet.

6. A method as claimed in claim 5, wherein the barrier is arranged at an angle of 45 degrees to the direction of passage of the first sheet.

7. A method as claimed in claim 5, wherein the elongated structure is selected from the group consisting of a bar, rod and roller.

8. A method as claimed in claim 1, further comprising the step of passing the laminated material through one or more rollers after passage adjacent the barrier.

9. A method as claimed in claim 1, wherein said prepolymer polymerises to form polyurethane.

10. A method as claimed in claim 3, wherein the sheet materials are flexible and are selected from the group consisting of paper, plastics materials, metal foil and metallised plastics materials.

* * * * *